(12) United States Patent
Haddad

(10) Patent No.: US 8,340,210 B2
(45) Date of Patent: Dec. 25, 2012

(54) APPARATUS AND METHOD FOR CREST FACTOR REDUCTION ARCHITECTURE

(75) Inventor: Khalil C. Haddad, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 12/764,755

(22) Filed: Apr. 21, 2010

(65) Prior Publication Data

US 2011/0261896 A1    Oct. 27, 2011

(51) Int. Cl.
    H04L 27/00    (2006.01)
(52) U.S. Cl. ......... 375/295; 375/259; 375/285; 375/296
(58) Field of Classification Search .......... 375/259, 375/285, 295, 296
    See application file for complete search history.

(56) References Cited

U.S. PATENT DOCUMENTS

| | | | |
|---|---|---|---|
| 5,991,262 A | 11/1999 | Laird et al. | |
| 6,009,090 A | 12/1999 | Oishi et al. | |
| 6,175,551 B1 | 1/2001 | Awater et al. | |
| 7,095,798 B2 | 8/2006 | Hunton | |
| 7,313,373 B1 * | 12/2007 | Laskharian et al. | 455/127.1 |
| 7,409,009 B2 | 8/2008 | Akhtman | |
| 7,634,024 B2 | 12/2009 | Tan | |
| 7,944,991 B2 * | 5/2011 | Zhao et al. | 375/296 |
| 8,107,553 B2 * | 1/2012 | Wernaers | 375/295 |
| 2002/0191705 A1 * | 12/2002 | Melsa et al. | 375/295 |
| 2005/0111576 A1 | 5/2005 | Anvari | |
| 2005/0118966 A1 | 6/2005 | Anvari | |
| 2005/0163248 A1 * | 7/2005 | Berangi et al. | 375/296 |
| 2007/0058743 A1 | 3/2007 | Hunton | |
| 2007/0076588 A1 | 4/2007 | Alapuranen | |
| 2007/0121483 A1 * | 5/2007 | Zhang et al. | 370/208 |
| 2007/0140376 A1 | 6/2007 | Kang | |
| 2007/0182486 A1 * | 8/2007 | Chieng et al. | 330/207 P |
| 2008/0137767 A1 * | 6/2008 | Jaenecke | 375/267 |
| 2008/0265996 A1 | 10/2008 | Kim et al. | |
| 2008/0271094 A1 * | 10/2008 | Kliger et al. | 725/80 |
| 2008/0317163 A1 | 12/2008 | Dittmer | |
| 2009/0169022 A1 * | 7/2009 | Kost | 381/56 |
| 2010/0027690 A1 * | 2/2010 | Liang et al. | 375/260 |
| 2012/0044018 A1 * | 2/2012 | Kost | 330/10 |

OTHER PUBLICATIONS

O. Vaananen, et al., "Simple algorithm for peak windowing and its application in GSM, EDGE and WCDMA systems", IEE Proc.-Commun., vol. 152, No. 3, Jun. 2005.

International Search Report dated Drecember 14, 2011 in connection with International Patent Application No. PCT/KR2011/002875.

* cited by examiner

*Primary Examiner* — Jean B Corrielus

(57) ABSTRACT

A device and a method for crest factor reduction reduces peak-to-average ratio (PAR) to increase power amplifier efficiency. A first hard clipping block performs hard clipping on an input signal when the amplitude of the input signal is greater than a first threshold. A shaping filter reshapes the spectrum of the hard clipped signal. An interpolator increases the sampling rate of the reshaped signal. A second hard clipping block performs hard clipping on the interpolated signal when the amplitude of the interpolated signal is greater than a second threshold.

20 Claims, 5 Drawing Sheets

FIG. 5C
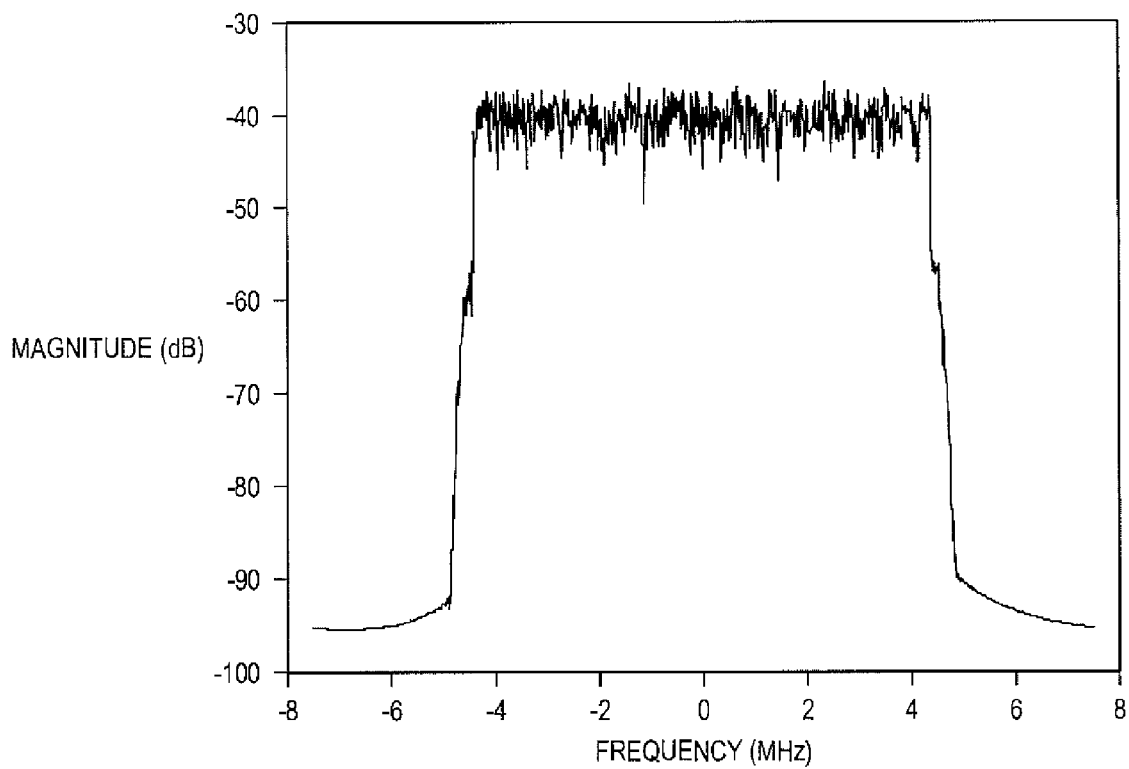
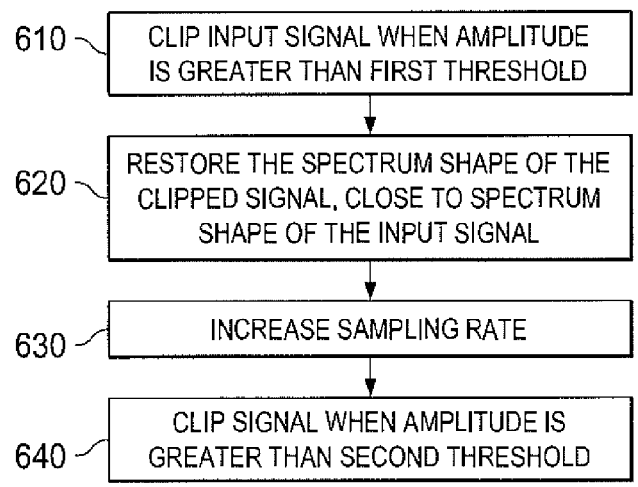
FIG. 6

APPARATUS AND METHOD FOR CREST FACTOR REDUCTION ARCHITECTURE

TECHNICAL FIELD OF THE INVENTION

The present application relates generally to increasing power amplifier efficiency in transmitters and, more specifically, to crest factor reduction (CFR).

BACKGROUND OF THE INVENTION

Multicarrier signals that are based on OFDM technology such as Worldwide Interoperability for Microwave Access (WiMAX) and Long Term Evolution (LTE) signals suffer from high peak-to-average ratio (PAR). These wideband signals are subject to severe in-band and out-of-band distortion when they are transmitted using power amplifiers (PAs) that operate outside their linear range. Since high linearity requirements leads to low power efficiency and, therefore, to high power consumption, processing the signal to reduce the PAR by crest factor reduction (CFR) techniques contribute to increasing the PA efficiency.

Crest factor reduction is typically used in transmitters and helps to linearize the amplifier. CFR is a technique that clips the magnitude of the transmitted signal to a certain level, such as an OFDM signal, to decrease the peak-to-average ratio prior to transmission. There are various schemes of crest factor reduction that can be divided into two main categories: the first does not require receiver side modification. The second does require receiver side modifications. Methods that require receiver side modifications include tone injection, selected mapping, partial transmit, and tone reservation, and such. These schemes are known to be complex (high amount of hardware (field-programmable gate array (FPGA), application-specific integrated circuit (ASIC) resources) and may have good performance (good adjacent channel leakage ratio (ACLR) and good error vector magnitude (EVM)); however, they may not be acceptable if there is a requirement that the receiver must not modify the received signal. Among the schemes that do not require receiver side modifications are schemes based on hard clipping, peak cancellation by windowing and active constellation, and such. These are known to have moderate complexity (moderate hardware resources) and moderate performance (ACLR and EVM) since hard clipping has an adverse effect on the ACLR and windowing has an adverse effect on the EVM.

When hardware resources are low there is a need in the art for an improved crest factor reduction technique. In particular, there is a need for an improved crest factor reduction technique that uses very low hardware resources and delivers good performance (good ACLR and good EVM).

SUMMARY OF THE INVENTION

To address the above-discussed deficiencies of the prior art, it is a primary object to provide, a device for use in a crest factor reduction architecture. The device includes a first hard clipping block configured to hard clip an input signal when the amplitude of the input signal is greater than a first threshold and output a clipped signal. A shaping filter is configured to reshape the spectrum of the clipped signal and output a spectrum reshaped signal. An interpolator is configured to increase a sampling rate of the reshaped signal and output an interpolated signal, and a second hard clipping block is configured to hard clip the interpolated signal when the amplitude of the interpolated signal is greater than a second threshold and output an output signal.

A method for crest factor reduction is provided. The method comprises hard clipping an input signal when the amplitude of the input signal is greater than a first threshold to output a clipped signal. The spectrum of the clipped signal is reshaped to output a spectrum reshaped signal. The sampling rate of the reshaped signal is increased to output an interpolated signal, and the interpolated signal is hard clipped when the amplitude of the interpolated signal is greater than a second threshold to output an output signal.

In one embodiment, a transmitter is provided. The transmitter comprises a crest factor reduction device that is configured to perform a first hard clip on an input signal when the amplitude of the input signal is greater than a first threshold, reshape the spectrum of the first hard clipped signal, interpolate the reshaped signal to increase a sampling rate of the reshaped signal, and perform a second hard clip on the interpolated signal when the amplitude of the interpolated signal is greater than a second threshold.

The crest factor reduction device may be implemented in a field-programmable gate array (FPGA) or an application-specific integrated circuit (ASIC).

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A-5C respectively illustrate the spectra of the signal at the input of the first hard clipping block, at the output of the first hard clipping block, and at the output of the shaping filter according to an embodiment of the present disclosure; and FIG. 6 illustrates a CFR process according to an embodiment of the present disclosure.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged transmitter.

Figure 1:
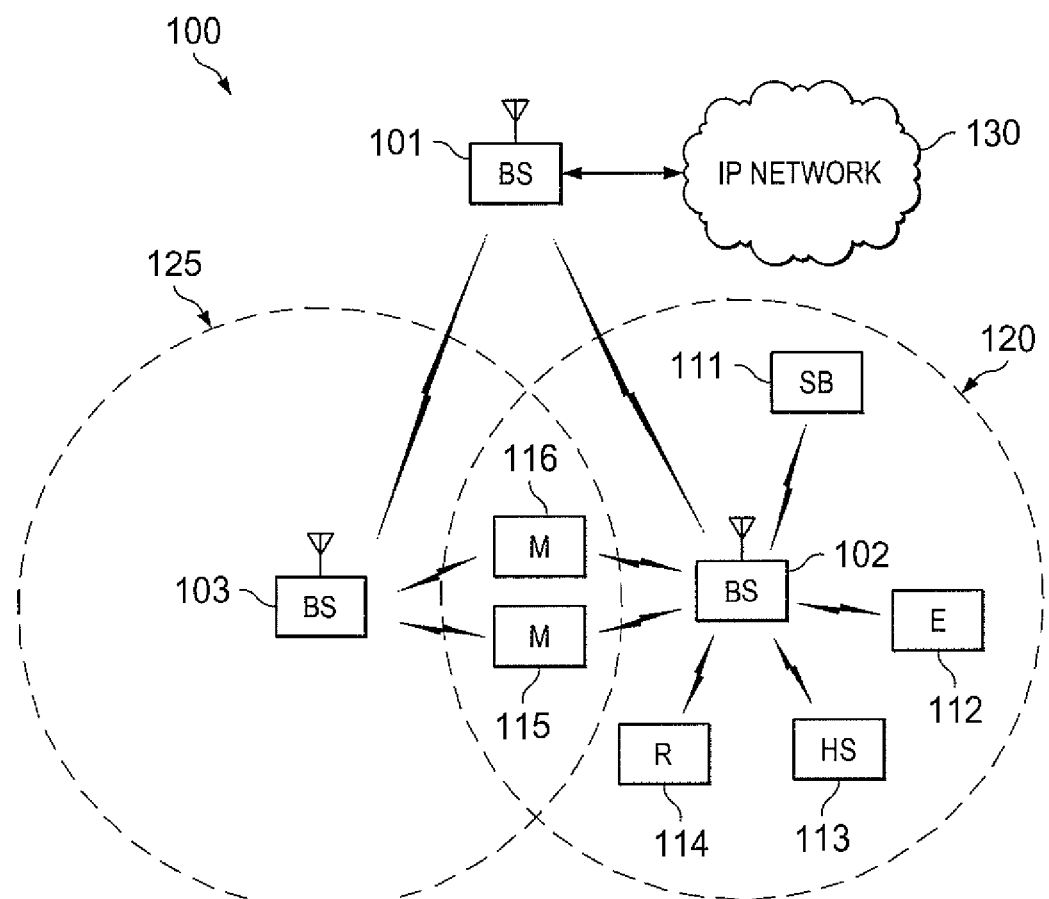
FIG. 1 illustrates an exemplary wireless network in which crest factor reduction architecture can be implemented, according to the principles of the disclosure.

FIG. 1 illustrates exemplary wireless network 100, which transmits ACK/NACK messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
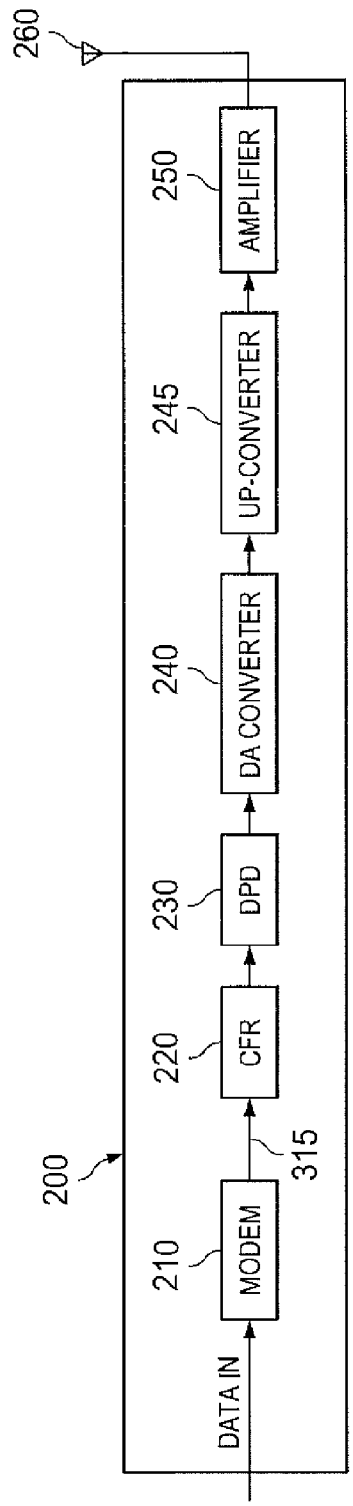
FIGS. 2A and 2B illustrate a high-level diagram of a transmitter and a CFR architecture, respectively, according to an embodiment of the present disclosure.

FIG. 2A is a high-level diagram of a transmitter 200 according to an embodiment of the present disclosure. Transmitter 200 may be used in base stations 101-103, subscriber stations 111-116, or any communications device that transmits signals. Transmitter 200 includes a modem 210, a CFR block 220, a digital pre-distortion block 230, a digital-to-analog (DA) converter 240, an amplifier 250, and an antenna 260. The modem 210, modulates a signal for transmission and demodulates a received signal. When transmitting, the modem converts raw input data to a sequence of symbols, then modulates the symbols to a time-domain baseband digital signal according to some type of modulation scheme. The CFR block 220, which is discussed further below, reduces PAR in the modulated signal. Digital Pre-Distortion (DPD) block 230, a non-linear module that linearizes power amplifiers (PA), has an inverse response of the power amplifier (PA), so the overall response at the output of the PA is linear. The DA converter 240 converts the digital signal to an analog signal, the up-converter 245 converts the signal to RF frequency, and the power amplifier 250 amplifies the low-power RF signal to drive the antenna 260 during transmission of the RF signal.

Figure 2B:
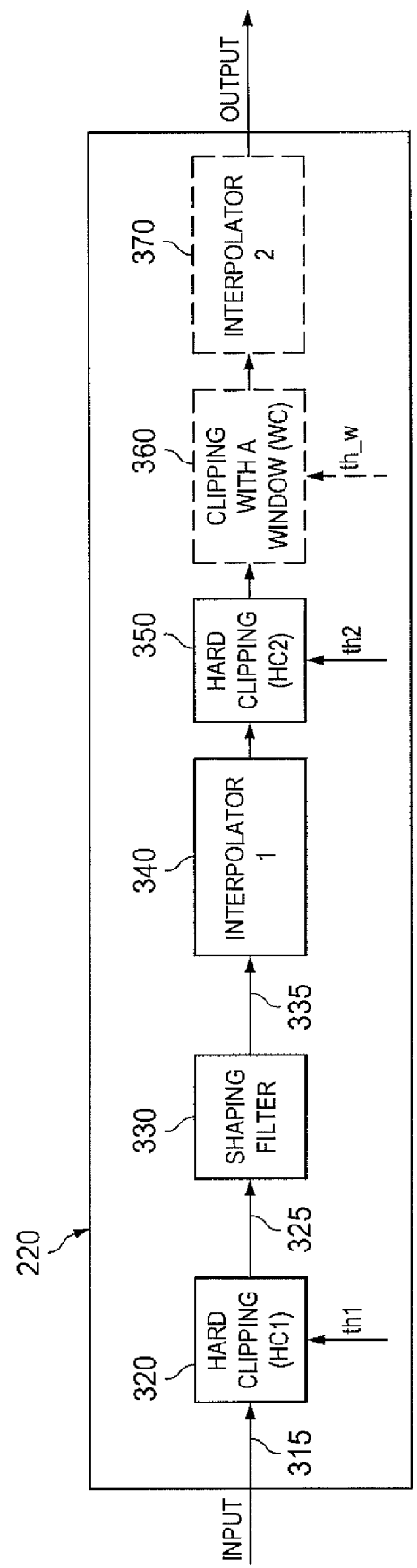

FIG. 2B illustrates a high level architecture of a CFR structure, such as CFR block 220, according to an embodiment of the present disclosure. The CFR structure may be implemented in a transmitter, such as transmitter 200. The solid lines represent standard components, and the broken lines represent optional components. CFR block 220 includes a first hard clipping block (HC1) 320, a shaping filter 330, an interpolator 340, a second hard clipping block 350. The CFR block 220 may also include a window clipping block (WC) 360 and a second interpolator 370.

Figure 3:
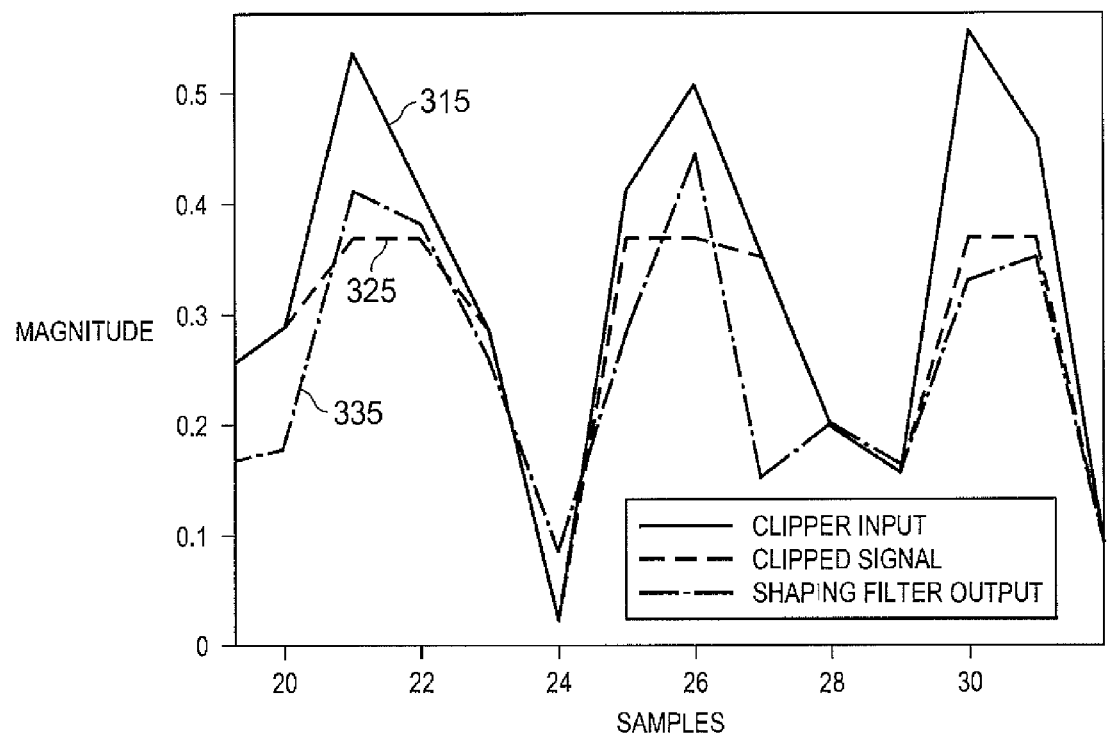
FIG. 3 illustrates signal responses within the CFR architecture, according to an embodiment of the present disclosure.

The CFR block 220 may receive, as input from the modem 210, a single or multicarrier baseband signal. The modem 210 generates a clipper input signal 315 that contains high peaks, as shown in FIG. 3. These high peaks cause high peak-to-average ratios (PARs) and can damage the power amplifier (PA).

The first hard clipping block 320 performs a hard clipping operation on the amplitude of its input signal when its level is above a certain defined threshold A, while preserving the phase of the clipped part. The part of the signal below the level A remains untouched. This clipping operation on the amplitude can be described by the following equation:

$$y(n) = c(n)x(n) \quad [\text{Eqn. 1}]$$

$$\text{where } c(n) = \begin{cases} 1 & \text{if } |x(n)| \le A \\ \dfrac{A}{|x(n)|} & \text{if } |x(n)| > A \end{cases} \quad [\text{Eqn. 2}]$$

In Equation 1, x(n) is the clipper input signal 315, y(n) is the clipped signal 325, and A is the first threshold (th1) level. In other words, the input signal is clipped such that the amplitude of the clipped signal plateaus at the maximum allowed level A when the amplitude of the input signal is greater than the level A. In the first hard clipping block 320, the maximum allowed amplitude level is represented by the th1. Thus, when the amplitude of the clipper input signal 315 is greater than th1, the first hard clipping block 320 outputs a value of th1 in the clipped signal 325.

While peak hard clipping produces a signal with better EVM than the windowing method, it does, however, reduce the PAR of the clipper input signal 315. It also widens the spectrum, causing out-of-band radiation and degrading the adjacent channel leakage power ratio (ACLR). As the peak hard clipping becomes more aggressive (i.e. as th1 is decreased), the out-of-band radiation and the ACLR degradation gets worse.

Figure 4:
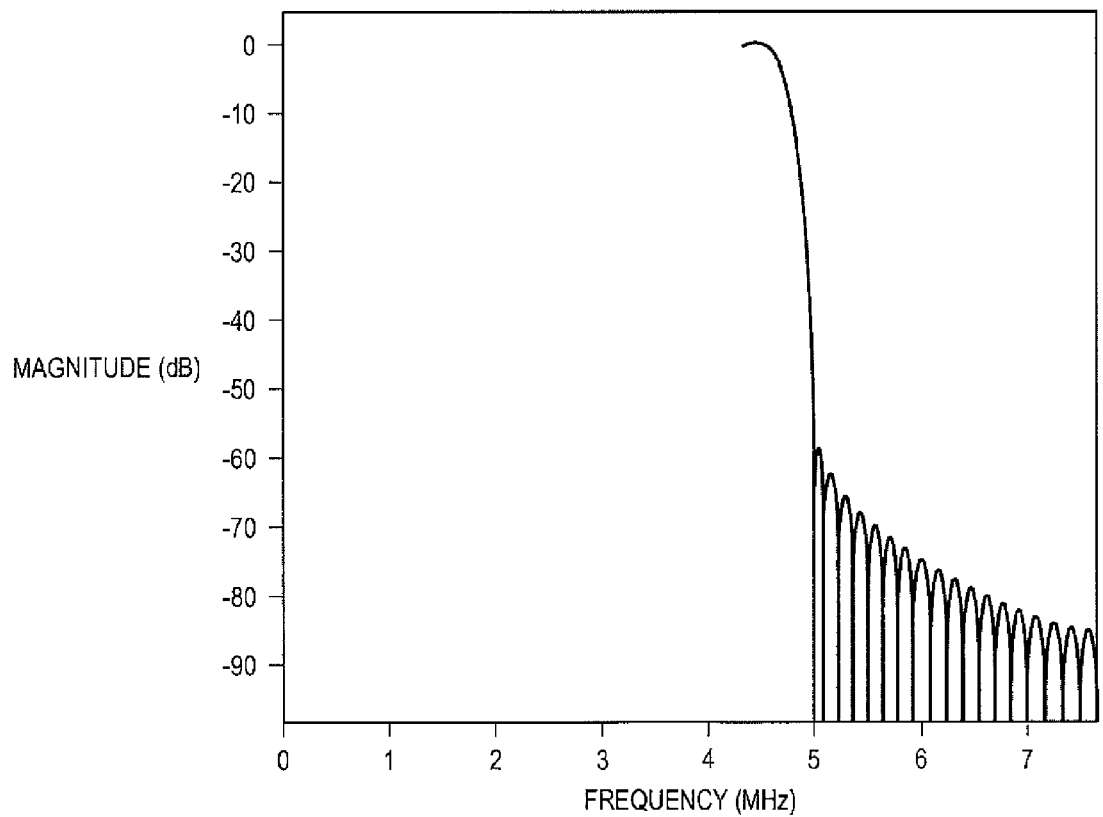
FIG. 4 illustrates a spectrum of the shaping filter, according to an embodiment of the present disclosure.

The shaping filter 330 is used to increase the ACLR of the clipped signal 325 close to the ACLR of the clipper input signal 315. The shaping filter 330 may use a very sharp filter to reshape the spectrum of the clipped signal 325 back to a more desirable shape without affecting the in-band spectrum of the clipped signal. The spectrum of a typical sharp filter used in the shaping filter 330 for shaping a 10 MHz signal is illustrated in FIG. 4. The shaping filter is made sharp enough to satisfy the ACLR requirements of the CFR output. The shaping filter 330, however, causes a mild re-growth of some of the peaks that were clipped by the first hard clipping block 320, though the peaks of the shaping filter output 335 are not as extreme as the peaks of the clipper input signal 315. Comparison of the signal responses between the clipper input signal 315, the clipped signal 325, and the shaping filter output 335 is illustrated in FIG. 3. Because the clipper input signal 315 is clipped aggressively by the first clipping block 320, the PAR of the shaping filter output 335 is significantly lower than the PAR of the clipper input signal 315 while still maintaining a good ACLR. As such, th1 of the first hard clipping block 320 may be tuned by analyzing the spectrum of the CFR output while also checking the error vector magnitude (EVM).

CFR, which is used to increase PA efficiency in transmitters, can be implemented as a part of a digital pre-distortion (DPD) design to reduce PAR. DPD significantly increases the signal bandwidth. As such, the interpolator 340 increases the sampling rate to prevent aliasing that would otherwise occur due to the bandwidth increase caused by the DPD. In an embodiment, the interpolator 340 increases the sampling rate to a high sampling rate that covers the DPD output spectrum, such as the Nyquist rate. A key benefit of using the shaping filter 330 prior to increasing the sampling rate in the interpolator 340 is that reshaping the spectrum of a signal at a low sampling rate requires a lower amount of hardware resources.

Interpolator 340 is illustrated in FIG. 2B as a single block. In some embodiments, the interpolator 340 may be divided into multiple interpolators such that each successive interpolator incrementally increases the sampling rate. In one embodiment, one or more optional hard clipping blocks may be placed between the multiple interpolators.

The interpolator 340, like the shaping filter 330, will cause mild peak re-growth. Therefore, the second hard clipping block 350 clips the signal that is output from the interpolator 340. In an embodiment, the second threshold th2 of the second hard clipping block 350 is set to determine the maximum amplitude of the output signal, which in turn determines the acceptable PAR value. The second hard clipping block 350 decreases the ACLR mildly to an acceptable level, not like the first hard clipping block 320. This is due to the mild peaks re-growth that is caused by the shaping filter 330 and the interpolator 340, as well as the value of th2 that is greater than th1.

In one embodiment, th1 of the first hard clipping block 320 is set to be much lower than th2 of the second hard clipping block 350 due to the re-growth of the peaks caused by the shaping filter 330 and the interpolator 340. For example, th1 of the first clipping block 320 may be set to clip the clipper input signal 315 by as much as 50%, while th2 of the second clipping block 350 is set to clip 30% or less, depending on the desired maximum peak of the output signal. Consequently, th1 may be set to be much lower than th2 such that the peak of the signal, after being processed by the shaping filter 330 and the interpolator 340, is near the desired or standard value.

In an embodiment, an optional window clipper 360 may be used to further clip the signal after the second hard clipping. The threshold th_w and the filter of the window clipper 360 can be set to further shape the spectrum of the output signal, if needed.

In another embodiment, an optional second interpolator 370 can be used to further increase the sampling rate. The peaks re-growth caused by the second interpolator 370 is negligible. The optional second interpolator 370 may be placed either before or after the second hard clipping block 350.

The CFR architecture, as described with reference to FIG. 2B, can be implemented before a digital pre-distortion block. In some embodiments, the CFR architecture may be implemented as a device in a transmitter. The CFR architecture may also be used in a transmitter of a base station. Moreover, the CFR architecture may be implemented in a field programmable gate array (FPGA), an application-specific integrated circuit (ASIC) or a microprocessor.

Figure 5A:
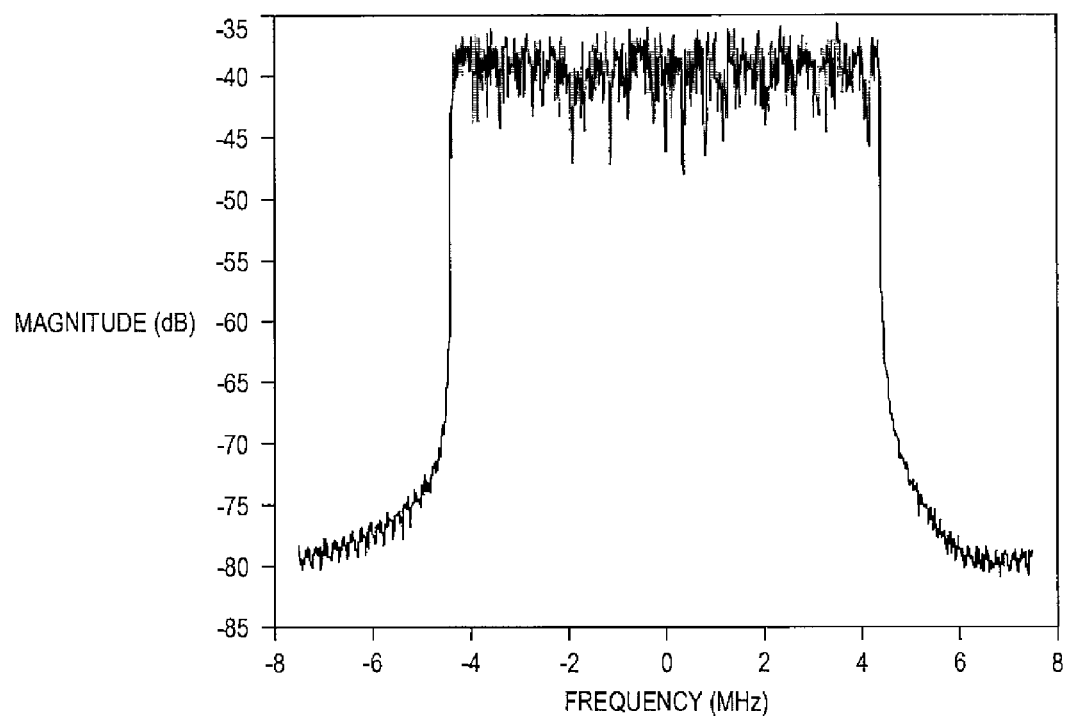
Figure 5B:
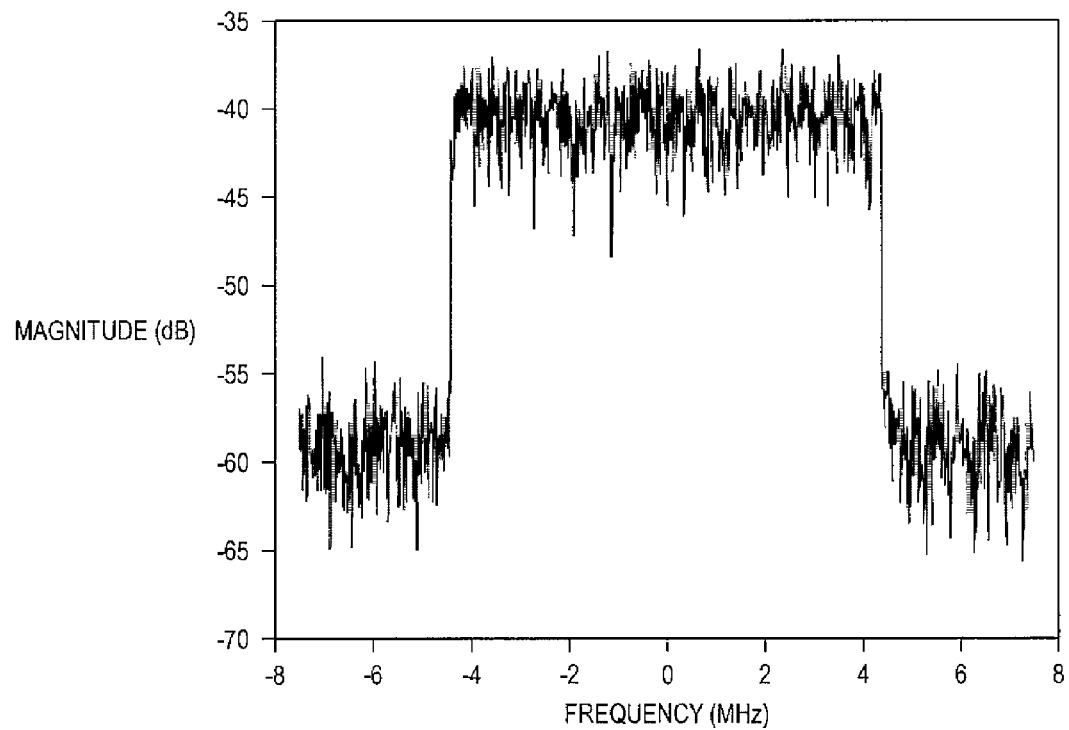

FIGS. 5A-5C illustrate the spectra of the signal at the input of the first hard clipping block 320, at the output of the first hard clipping block 320, and at the output of the shaping filter according to an embodiment of the present disclosure. FIG. 5A illustrates the spectrum of a signal as it is processed through the first hard clipping block 320 and the shaping filter 330. The spectrum in FIG. 5A corresponds to the clipper input signal 315. The spectrum in FIG. 5B corresponds to the clipped signal 325. The spectrum of the clipped signal 325, which is the output of the first hard clipping block 320, has a noticeably worse ACLR as compared to the clipper input signal 315. The spectrum in FIG. 5C, which corresponds to the shaping filter output 335 has an improved ACLR.

FIG. 6 illustrates a CFR process 600 according to an embodiment of the present disclosure. Prior to the CFR process 600, one or more baseband signals are processed to generate an input signal that may be a single or multicarrier signal.

In block 610, peak hard clipping is performed on the input signal. That is, the input signal is clipped when the amplitude is greater than a first threshold. The peak hard clipping can be described by Equations 1 and 2. Block 610 may be performed by a hard clipping unit, such as the first hard clipping block 320. While peak hard clipping reduces the PAR of input signal, such as clipper input signal 315, it also widens the spectrum, causing out-of-band radiation and degrading the adjacent channel leakage power ratio (ACLR). As the peak hard clipping becomes more aggressive (i.e. as th1 is decreased), the out-of-band radiation and the ACLR degradation gets worse.

In block 620, the clipped signal spectrum is reshaped to restore the spectrum shape of the input signal. Block 620 may be performed by a shaping filter, such as shaping filter 330, which may use a very sharp filter to reshape the spectrum of the clipped signal 325 back to a more desirable shape. Reshaping the clipped signal prior to increasing the sampling rate requires fewer hardware resources.

In block 630, the sampling rate of the reshaped signal is increased. Block 630 may be performed by an interpolator, such as interpolator 340. Increasing the sampling rate prevents aliasing that would otherwise occur due to a bandwidth increase caused by DPD. In another embodiment the sampling rate is increased if a higher sampling rate is needed to accommodate a bandwidth resulted from digital pre-distortion.

In some embodiments, block 630 may be divided into multiple stages, such that the sampling rate is increased incrementally in each successive stage. In one embodiment, one or more peak hard clipping may be performed between stages.

Reshaping the signal and increasing the sampling rate causes mild peaks re-growth. In block 640, peak hard clipping is performed again, using a second threshold th2. That is, the signal is clipped when the amplitude is greater than th2. In an embodiment th1 is set to be lower than th2. Block 640 may be performed by a hard clipping unit, such as the second hard clipping block 350.

In an embodiment, process 600 may be followed by window clipping in order to further clip the output signal or change the shape of spectrum using a threshold th_w. In another embodiment, the sampling rate may be increased after process 600 has completed.

The CFR process 600 may be performed by the CFR architecture as described, above, with reference to FIG. 2B. The CFR process 600 may also be performed by a microprocessor as a software program stored in a memory.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a crest factor reduction architecture, a device comprising:
    a first hard clipping block configured to hard clip an input signal when the amplitude of the input signal is greater than a first threshold and output a clipped signal;
    a shaping filter configured to reshape a spectrum of the clipped signal toward a spectrum shape of the input signal, and output the reshaped signal;
    an interpolator configured to increase a sampling rate of the reshaped signal and output an interpolated signal; and
    a second hard clipping block configured to hard clip the interpolated signal when the amplitude of the interpolated signal is greater than a second threshold and output an output signal.

2. The device of claim 1, wherein the first threshold is lower than the second threshold.

3. The device of claim 1, wherein the shaping filter is further configured to reshape the spectrum of the clipped signal by causing a mild re-growth of one or more peaks of the input signal that were clipped by the first hard clipping block.

4. The device of claim 3, wherein the first threshold is determined based on at least one of a resulting adjacent channel leakage ratio (ACLR) and an error vector magnitude (EVM), wherein the shaping filter is configured to restore the resulting ACLR close to an initial ACLR of the input signal.

5. The device of claim 1, wherein the interpolator is a first interpolator, the device further comprising a second interpolator configured to increase the sampling rate of the output signal.

6. The device of claim 1, wherein the interpolator comprises at least a first stage interpolator and a second stage interpolator, the first stage interpolator configured to output a first stage signal.

7. The device of claim 6, further comprising a third hard clipping block located between the first stage interpolator and the second stage interpolator, the third hard clipping block configured to hard clip the first stage signal when the amplitude of the first stage signal is greater than a third threshold.

8. The device of claim 1, further comprising a window clipping block configured to window clip the output signal, wherein a window clipping threshold determines the peak-to-average ratio (PAR) of the output signal.

9. A method for crest factor reduction, the method comprising:
    hard clipping an input signal when the amplitude of the input signal is greater than a first threshold to output a clipped signal;
    reshaping a spectrum of the clipped signal toward a spectrum shape of the input signal, and outputting the reshaped signal;
    increasing a sampling rate of the reshaped signal to output an interpolated signal; and
    hard clipping the interpolated signal when the amplitude of the interpolated signal is greater than a second threshold to output an output signal.

10. The method of claim 9, wherein the first threshold is lower than the second threshold.

11. The method of claim 9, wherein reshaping the spectrum of the clipped signal comprises causing a mild re-growth of one or more peaks of the input signal that were clipped by the first hard clipping.

12. The method of claim 11, wherein the first threshold is determined based on at least one of a resulting adjacent channel leakage ratio (ACLR) and an error vector magnitude (EVM), such that reshaping the clipped signal increases the resulting ACLR close to an initial ACLR of the input signal.

13. The method of claim 9, further comprising increasing the sampling rate of the output signal.

14. The method of claim 9, wherein increasing the sampling rate of the clipped signal comprises performing a first stage interpolation and a second stage interpolation, and wherein the first stage interpolation outputs a first stage signal.

15. The method of claim 14, further comprising hard clipping the first stage signal when the amplitude of the first stage signal is greater than a third threshold.

16. The method of claim 9, further comprising window clipping the output signal, wherein the window clipping threshold determines the peak-to-average ratio (PAR) of the output signal.

17. A transmitter, comprising:
    a crest factor reduction device configured to:
        perform a first hard clip on an input signal when the amplitude of the input signal is greater than a first threshold,
        reshape a spectrum of the first hard clipped signal toward a spectrum shape of the input signal,
        interpolate the reshaped signal to increase a sampling rate of the reshaped signal, and
        perform a second hard clip on the interpolated signal when the amplitude of the interpolated signal is greater than a second threshold.

18. The transmitter of claim 17, wherein the first threshold is lower than the second threshold.

19. The transmitter of claim 17, wherein the crest factor reduction device is a field-programmable gate array (FPGA).

20. The transmitter of claim 17, wherein the crest factor reduction device is an application-specific integrated circuit (ASIC).

* * * * *